May 2, 1961    W. P. ISAACSON ET AL    2,982,943
SIGNAL FAILURE INDICATION AND SYSTEM CONTROL
Filed June 4, 1956

INVENTORS
WALTER P. ISAACSON
LUIS H. TEJADA-FLORES
BY
*[signature]*
AGENT

United States Patent Office 2,982,943
Patented May 2, 1961

2,982,943
SIGNAL FAILURE INDICATION AND SYSTEM CONTROL

Walter P. Isaacson, Los Angeles, and Luis H. Tejada-Flores, Pasadena, Calif., assignors, by mesne assignments, to Dresser Industries, Inc., Dallas, Tex., a corporation of Delaware Filed June 4, 1956, Ser. No. 589,298
19 Claims. (Cl. 340—18)

This invention relates in general to well borehole logging systems of the type in which information obtained at an inaccessible point within a borehole is signaled to the surface of the earth by signals comprising time-spaced pairs of pulses, and more specifically to an improvement for preventing false logging or registrations of values improperly or incorrectly signaled from within the well. In the type of logging systems to which the invention primarily relates, logging operations are conducted in stepwise or cyclical fashion, each cycle being commenced or initiated by an initiating action such as for example, closure of a switch, in response to which measurements are effected at the inaccessible point in the earth well and time-spaced signal pulses transmitted upon a suitable transmission medium extending to an operating point outside the well for utilization in logging apparatus. The measurement value or other bit of information obtained within the borehole during a given cycle is conveyed to the operating point or location outside the borehole by an individual pair of signal pulses the time separation of which comprises an indication of the value of the measurement or other bit of information obtained in the borehole.

This application is a continuation-in-part of abandoned application Serial No. 521,974, filed July 14, 1955.

In a specific example of this type of borehole logging the acoustic velocity of an acoustic wave through the borehole encircling rock along an incremental unit of distance lengthwise of the borehole is translated into the time interval separating the first and second pulses of a pair of signal pulses, the measurement and signals being repeated at each of stations situated along the borehole and spaced apart by said incremental distance. The acoustic information or series of values represented by succeeding pairs of signal pulses is adapted to be integrated by apparatus at the surface and the results of the integration indicated on a suitable record medium.

In the known system of thus recording travel time or velocity measurements, reception of either the first or the second pulse of a given pair of signal pulses without the other pulse of the pair leads to false or incorrect integration of values at the surface apparatus, as will hereinafter be made clearly evident.

The present invention provides means whereby integration of a signaled value is prevented in the event either or both of the pulses of a signal pulse pair is not properly received at the apparatus at the surface of the earth, and additionally provides means whereby a new measurement-signaling cycle may not be commenced until rectification of the erroneous operation of the apparatus is effected. Further, the present invention provides means for indicating the arrival of each of the pulses of a single pulse pair, whereby non-arrival of either of the pulses of a pair may readily be determined. To these ends apparatus is connected to the transmission meduim upon which signals are transmitted from the apparatus within the earth well to the surface of the earth, for detecting each pulse received and for permitting translation of pulses to the logging apparatus only in the event both the first and the second pulses of a pulse pair are received in properly time-spaced relationship. The logging apparatus is connected to the signal transmission medium by way of a switch means and a signal delay device whereby signal pulses arriving on the transmission medium may be translated to the logging apparatus only after being delayed by the pulse delay device and during such interval as the switch means is closed. The switch means is normally maintained in open-circuit condition and is closed only in the event the aforementioned apparatus determines that a complete pair of properly time-related signal pulses has arrived and constitutes a signal suitable for translation to the logging apparatus.

In some aspects the invention relates to and provides an improvement upon an acoustic wave velocity well logging system disclosed in copending abandoned application of Walter P. Isaacson, Serial No. 521,973, filed July 14, 1955, to which reference may be made for details of apparatus related to this invention but not per se of the present invention. In that application there is disclosed a cyclically operating system for providing, among other things, graphical records or logs of acoustic wave velocities through earth formations encircling an earth borehole and of total time of travel of respective acoustic waves through unit distances along the rock adjacent the borehole. The latter log is produced by a procedure including cyclically or repetitively initiating an operations cycle which includes determining the time for an acoustic wave to travel through one unit length of formation or distance alongside the borehole, once for and at each of a plurality of borehole stations or levels regularly spaced unit distance apart, and electronically integrating the values of the several measured time periods, followed by production of a sense-perceptible indication of the integration in the form of a graphical record.

Further, in that system, the time periods required for acoustic wave travel through unit distances are each demarked or defined by a respective pair of time-separated electric potential signal pulses the first of which is created concurrently with the arrival of an acoustic wave front at a first location and the second of which pulses is created concurrently with the arrival of the same acoustic wave front at a second location substantially one unit distance away from the first location, as measured along the borehole. The two electric signal pulses whose separation in time is thus a measure of time of travel of the acoustic wave, are transmitted as a signal or signal pulse pair from electro-acoustical means in the borehole or well to an operating location outside the borehole by way of a suitable signal transmission medium such as a conductor cable; and the transmitted pulses are at the operating location employed to open and close a gate circuit to admit a short train of regularly-recurring time-measuring electric potential pulses to suitable electronic counting means. The counting means counts or integrates the number of time-measuring pulses thus passed by the gate circuit, and provides an output proportional to the total; and also the apparatus adds the number of pulses of any train to the total of the pulses of all previously presented pulse trains, to provide an output representative of an integration of all of the pulses of a plurality of passed pulse trains.

From the foregoing sketch of the system disclosed in the mentioned copending application it is apparent that if either pulse of a pair of signal pulses is not received at the pulse gate or translating circuit, a serious error in the indicated time and total time values may readily be registered. For example, if the first of a signal pair is missing, the second pulse of the pair may then open the gate to pass time-measuring pulses until a pulse of another signal pair is received. The error is thought to be obvious. If the second pulse of a pair is missing, the gate will remain open and continue passage of time-measuring pulses long after termination should have occurred. Again the error in the result is obvious. Similarly, both pulses of a pair might be missing, resulting in lack of operation of the pulse gate circuit and causing erroneous indication of total time and a blank indication of velocity.

It is, therefore, a primary object of the present invention to provide means whereby the aforementioned erroneous results or indications may not be registered or logged and the faulty action of the apparatus brought to the attention of the operator so corrective measures may be taken.

Another object of the invention is to provide means in the subject type of system for detecting faulty operation of the signaling component of the apparatus and for preventing further cyclical operation until the fault has been corrected.

Another object of the invention is to provide a signal translation control means for a logging system of the type mentioned which will prevent translation or logging of information or values represented by defective signals.

Other objects and advantages of the invention which are hereinafter made apparent are attained by the invention, an illustrative embodiment of apparatus in a preferred form according to the invention being diagrammatically illustrated in the drawings, in which.

Figure 1:
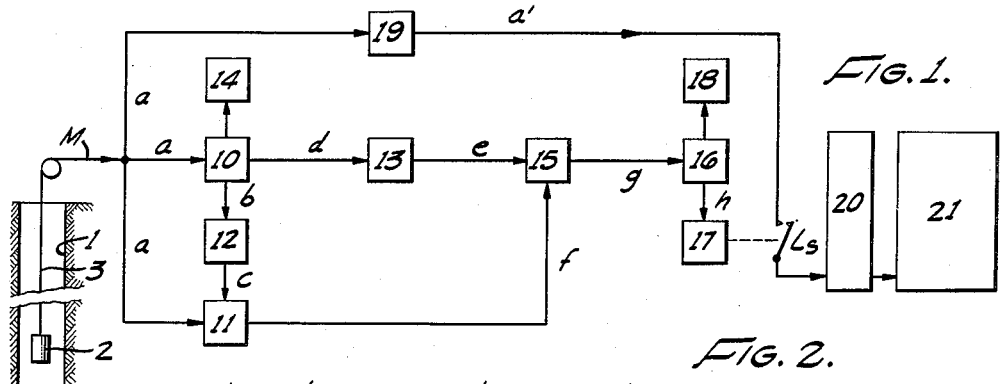
Figure 1 is a schematic block diagram illustrating acoustical apparatus suspended in an earth borehole by means of a conductor cable and illustrating signal flow, control functions, and the general arrangement of major components of apparatus at the logging location on the surface of the earth.

For purposes of attaining conciseness in an explanation of the principles thereof, the invention will be explained in connection with a logging system of the type disclosed in the aforementioned application of Isaacson, in which mensuration information is represented by the time separation or spacing of the first and second pulses of a pulse pair constituting an individual information-representing signal transmitted from within the well and receivable by the apparatus at the surface location. The received signal pulses may be, and preferably are, of the nature of pulses of electric current of short duration. As in the apparatus disclosed in the aforementioned application of Isaacson, a signaling and logging sequence is initiated by operation of suitable operations control means, such as by closure of an operations control switch. As soon as the operations control switch is closed, a cycle of procedures including signaling and logging operations may be commenced. Actual commencement of the operations depends upon the location of the sub-surface equipment or apparatus at a predetermined level in the well, and accordingly is preferably made dependent upon closure of a switch means actuated by the cable reeling or suspending means from which the cable is fed into or withdrawn from the well. At the moment the latter switch means is closed (or opened, in certain modified forms of apparatus) an acoustic wave is propagated at a determined station within the borehole and travels to spaced-apart sound detectors located preferably one unit distance apart along the borehole. At the detectors the leading wave front of the elastic wave or waves traveling through the borehole-encircling formation and/or the borehole contained fluid is transformed by transducer means in the detectors and fed into a wave translating or analyzing apparatus which in turn produces the aforementioned time-spaced first and second electric pulses of a signal pulse pair. The signal pulses may be transmitted up out of the borehole by way of one or more insulated conductors contained in the apparatus-suspending cable. If the acoustic wave detectors are spaced one unit distance apart along the borehole and are suitably spaced from the acoustic wave generator in the manner disclosed in the aforementioned copending application of Isaacson, the first and second electric pulses of a pulse pair will be spaced apart by a time interval which is inversely proportional to the velocity of the corresponding acoustic wave front through the borehole encircling rock adjacent the first and second acoustic wave detectors.

The present invention provides apparatus for translating the electrical pulse pairs received from the suspending cable or other signal transmission medium at the surface location, to the signal utilization means, which latter may be of the type and nature disclosed in the aforementioned Isaacson application or of any other suitable type. In accordance with the invention apparatus or means are provided whereby signal pulse pairs will be translated to the signal utilization means only when both the first and second pulses of the pair are received and when the second pulse of the pair succeeds or follows the first pulse within a predetermined time interval or lapse following arrival of the first pulse of the pair at the surface detecting apparatus. As hereinbefore indicated, the invention also provides means for preventing initiation of a new cycle of operations in the event both pulses of a signal pair are not received in proper time relationship. Additionally, the invention provides means for positively indicating arrival of each of the first and second pulses, as for example, by activating a respective signal light for each of the pulses properly received. Failure of either of the indicator lights to be illuminated provides an indication of the failure of a given respective pulse to arrive in proper time relationship with its mate. To prevent translation to the signal utilization means of a pulse of an improperly spaced-apart pair of pulses, or of single signal pulses, a signal transmission line is provided between the signal transmission medium and the signal utilization means, the line including a normally-open line-switch which is closed for translation of pulses to the signal utilization means only after apparatus according to the invention has determined the arrival of a properly time-related pair of pulses. To provide time for the apparatus to determine such proper arrival of a correctly time-related pair of signal pulses, and to permit closure of the aforementioned line switch for passage of a pulse pair to the signal utilization means, there is provided in the aforementioned transmission line, ahead of the line switch, a signal delay means or device which receives and delays all pulses arriving on the signal transmission medium, the period of delay provided being sufficient to permit determination of the arrival of a correctly time-related pair of signal pulses and closure of the line switch.

Referring now to the drawings and to Figure 1 in particular, there is indicated diagrammatically at 1 a typical earth borehole, in which acoustic apparatus indicated generally by numeral 2 is suspended from or upon a suitable conductor cable 3 in a fashion more fully disclosed in the aforementioned application of Isaacson. One or more electrical conductors of suspending cable 3 provide a suitable transmission medium for transmission of electric pulse pair signals from apparatus 2 to an operating location outside the borehole 1. Electrical apparatus of the present invention is connected at the aforementioned surface location to the transmission medium as indicated diagrammatically in Figure 1. Electric pulse signals arriving on the transmission medium are supplied directly to a first detector unit 10, a first pulse gate means 11, and a signal delay device or means 19, the nature and operation of each of which is hereinafter more fully explained. Received electrical pulses may be of the nature of those diagrammatically indicated in conventional fashion in wave form a of Figure 2, wherein P1 and P2 indicate respectively the first and second pulses of a signal pulse pair, the pulses being separated in time as represented by spacing $t1$–$t3$ in the drawing in an evident manner. A signal pulse received and detected by first detector 10 is translated into a pulse of greatly extended duration and applied to a pulse translation means 12 which acts to delay the thus elongated pulse to activate the first pulse gate means 11 for passage of a subsequently arriving pulse as hereinafter more fully described. Pulse gate means 11 is activated to translate pulses received directly from the transmission medium during only a predetermined interval of time following reception of the first pulse of a pair by first detector means 10.

Figure 2:
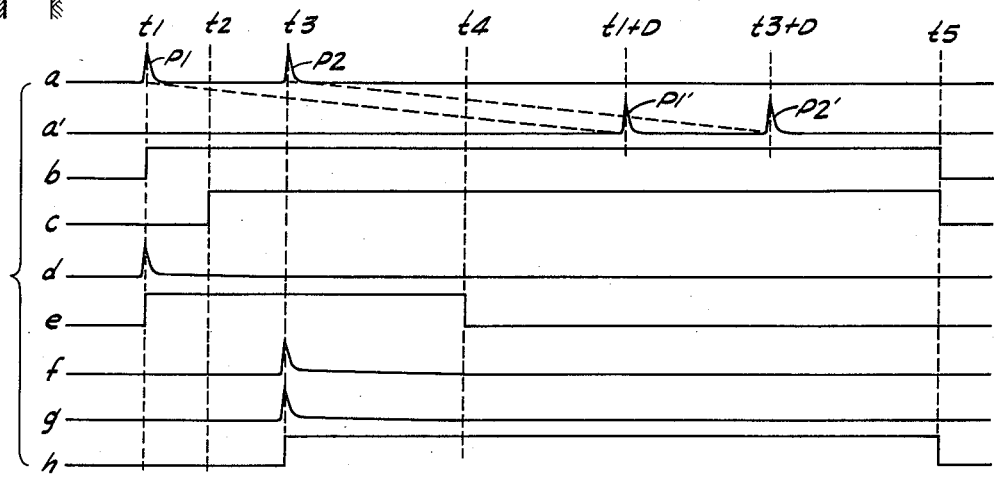
Figure 2 is a series of diagrams of wave forms representing the time relationship of various electric potentials with respect to time in the apparatus at the surface location.

Referring to Figure 2, wave form b indicates the elongated pulse received by pulse translation means 12; and wave form c illustrates the delayed elongated pulse provided pulse gate means 11 by pulse translation means 12 for activation of the pulse gate means. If the time of arrival of the first pulse of a pulse pair at detector 10 be designated by $t1$ and the critical potential level of graph or wave form c be designated by $t2$, then the time interval designated by $t2$ minus $t1$ represents the effective delay introduced by pulse translation means 12, and $t2$ will designate commencement of a time interval during which pulse gate means 11 is open and may translate a succeeding pulse received from the transmission medium.

Again referring to Figure 1, a signal pulse received at first detector means 10 is also translated or passed directly to a second pulse translation means 13, the passed pulse following the wave form indicated at d in Figure 2. Second pulse translation means 13 serves to elongate the received pulse and translate the elongated pulse to a second pulse gate means 15, the wave form of the pulse translated from means 13 to gate means 15 being substantially such as is indicated at e in Figure 2. Second pulse gate means 15 is adapted upon reception of the elongated or stretched pulse from translation means 13 to pass or translate, during the entire duration of that pulse, any signal received from the transmission medium and passed through first pulse gate means 11, any such passed signal being translated or passed by second pulse gate means 15 without time-displacement or substantial modification. The interval during which second pulse gate means 15 is rendered active to thus translate a signal pulse received from first pulse gate means 11 is adjustable, and commences at $t1$ and terminates as indicated in Figure 2, at a time designated $t4$.

From the preceding description it is evident that a first received pulse is simultaneously presented to first detector means 10, and first pulse gate means 11. Such first received pulse is substantially instantly translated through the first detector means 10 to the first pulse translation means 12 in elongated form and is used to there create an elongated delayed pulse which is applied to first pulse gate means 11 to open the latter at a later time designated $t2$. Since first pulse gate 11 is not open (that is, not active to translate a signal) at the time the first signal pulse arrives simultaneously at the first detector means 10 and first pulse gate means 11, the latter cannot translate such first pulse to the second pulse gate means 15. This first received pulse, herein designated P1, does, however, initiate action leading to opening of the pulse gate means 11 at time $t2$, and this open condition of the gate is continued until a selected time $t5$ as indicated in Figure 2. Additionally, the first received pulse, upon passing directly through first detector means 10, causes second pulse gate means 15 to open and remain open during the interval of time extending from $t1$ to $t4$ as determined by pulse translation means 13. Accordingly, it is evident that a second signal pulse arriving at the surface apparatus after time $t2$ and prior to time $t4$ will be directly translated through second pulse gate means 11 to pulse gate means 15, where it will be passed or translated directly to a second pulse detector means 16. It thus is evident that only in event of the arrival of a first signal pulse P1 at the surface apparatus, followed by reception of a second signal pulse P2 within the time interval $t2$ to $t4$, will a pulse be translated to the second pulse detector means 16. That is, second pulse detector 16 will be activated or receive a signal pulse only in the event of the reception by the surface apparatus of both the first and second pulses of a properly time-related signal pulse pair. Arrival of such a properly time related second pulse at second detector means 16 is utilized according to the present invention to initiate action leading to closure of the aforementioned line-switch, and initiation of operation of means enabling the commencement of a new signaling and logging cycle. The means and mode of operation whereby arrival of the second signal pulse P2 at second detector means 16 effects these functions will hereinafter be more fully explained.

Referring again to Figure 1, arrival of a signal pulse at first detector means 10 is according to the invention indicated by a first pulse indicating means 14 connected to the first detector means 10. Further, arrival of a signal pulse at second detector means 16 is indicated by a second pulse indicating means 18 connected to the second pulse detecting means 16. Operation of the two indicating means will hereinafter be more fully explained in connection with Figure 3 of the drawings. All signal pulses arriving over the transmission medium are supplied to a signal transmission line extending to the signal utilization means, the signal transmission line including a signal delay means 19, and a line switch Ls mechanically arranged as part of a relay means 17. Delayed signals passed from the signal delay device 19 through the line switch Ls are utilized by signal utilization apparatus comprising, preferably, a signal analyzing unit 20 and a recording unit 21. Signal analyzing unit 20 may include means for producing an output proportional to the interval of time elapsing between the delayed first and second pulses P1' and P2' of a signal pulse pair as they arrive from line switch Ls, integrating or other computing means, function circuitry and/or other apparatus, as more fully set out in the aforementioned Isaacson application. Unit 21 may comprise one or more suitable recording devices for recording the one or more outputs from unit 20, as indicated in the aforementioned Isaacson application.

Figure 3:
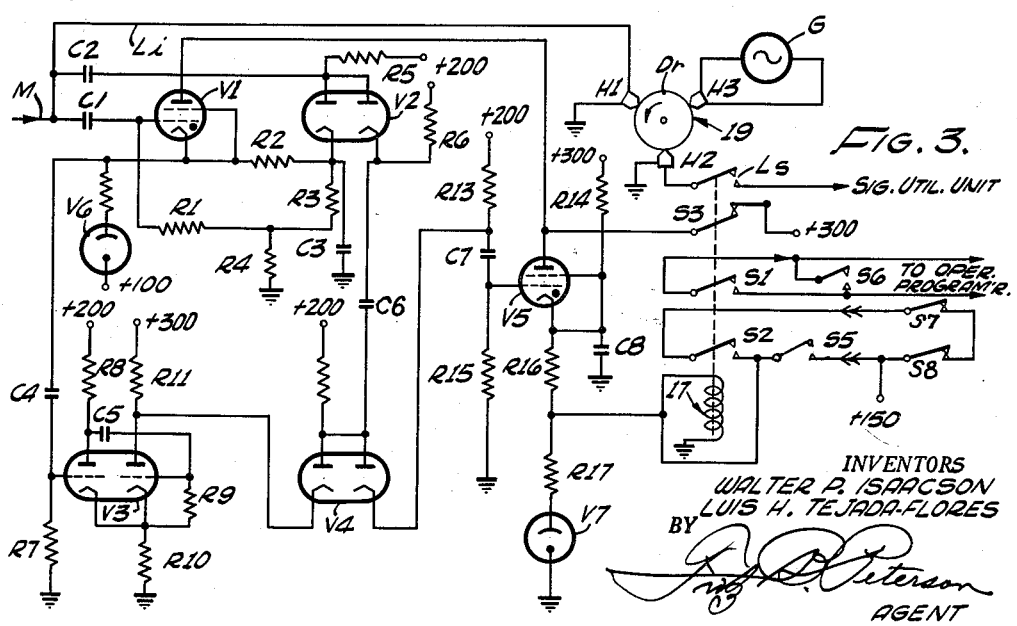
Figure 3 is a circuit diagram of certain electrical components of the illustrative embodiment of apparatus.

Referring now to Figure 3, electrical signal pulses of the nature hereinbefore described are receivable by the apparatus from a transmission medium here represented by a line M which as before indicated may comprise one or more electric conductors of the suspending cable 3, and the pulses are translated directly through a capacitor C1 to the first pulse detector means. That detector means comprises a first thyratron V1. The signal pulses also pass through a signal transmission line Li to the signal delay device indicated generally at 19. The delay device as herein illustrated comprises a magnetic drum device Dr rotated by any suitable means at a constant speed, conventional recording, reading and erasing heads, H1, H2 and H3, and suitable erasing head energizing means such as an alternating current generator G. Signal pulses P1 and P2 arriving on transmission line Li from medium M are impressed by head H1 upon the magnetic recording medium of drum Dr and equivalent pulses P1' and P2', delayed a time interval D, are derived from the recording medium by head H2 at subsequent times $t1+D$ and $t3+D$, the delay D being predetermined by the angular rate of rotation of the magnetic drum and by the relative peripheral locations of heads H1 and H2. Signals impressed upon the magnetic recording medium are, subsequent to pickup by head H2, erased or obliterated from the recording medium by erasing head H3 under the influence of an alternating magnetic field energized by power from generator G. The signal pickup device which includes head H2 and may include amplifying means, is connected to the aforementioned line switch Ls, the latter in turn being connected to the signal utilization means including units 20 and 21.

Application of a signal pulse arriving on transmission medium M and passing through capacitor C1 to the grid of thyratron V1 comprised in the first pulse detector, results in firing of V1 and an increase of voltage at its cathode from about one hundred volts to two hundred eighty-five volts. This voltage increase is indicated in the rise of graph b of Figure 2 and is applied, with appropriate time delay introduced by the combination of R2—C3 of the first pulse translation means, to the first half of the first pulse gate means V2 to open the latter. The potential thus applied to the cathode of the left section of V2, increases from zero value at time t1 to a value equal to the plate potential at time t2, and continues to rise to the mentioned higher value. When the cathode potential reaches the anode potential, the left half of V2 ceases to conduct and the anode potential on the right half of V2 rises to two hundred volts, equal to the cathode potential. This occurs at time t2 and renders the right half of V2 responsive to a received pulse to translate the latter on to the second pulse gate means 15. Thus it is seen that gate unit 11 is opened at time t2 subsequent to arrival of pulse P1 at unit 11, and that pulse P1 cannot pass gate 11 for that reason. Pulse gate means 11 remains open irrespective of the fact that the cathode potential may continue to rise to about two hundred eighty-five volts, since the left hand section of V2 continues nonconducting until a time t5, which is hereinafter defined. Thus the first pulse gate means 11 is open through the period of time t2 to time t5.

Concurrently with the rise of cathode potential as V1 continues to conduct, indicator tube V6, which may be a neon tube, illuminates and thus indicates arrival of the first signal pulse. Failure of tube V6 to illuminate is indicative of non-arrival of a signal pulse.

Prior to the firing of thyratron V1 by the incoming signal pulse P1 the anode potential on the right-hand section of V2 is about one hundred volts, due to conduction through the left-hand section and the resultant voltage drop through R5; and the cathode voltage of the right-hand section is about two hundred volts. The right-hand section of V2 will, under these circumstances, not conduct unless a positive anode potential in excess of the difference between anode and cathode potentials is applied. With the exemplary apparatus illustrated an input potential in excess of plus one hundred volts would be required to produce or start conduction of the right section of tube V2. Since the normal signal input potential will not ordinarily exceed plus ten volts, no change in the cathode voltage of the right section will thus far appear. Subsequent to firing of tube V1 the left half of tube V2 ceases conducting when its cathode potential rises to about two hundred volts, as previously noted, this occurring at time point t2, and then the anode voltage applied to the right-hand section of V2 rises to two hundred volts, leaving substantially no potential difference between the anode and the cathode of the latter section. Accordingly, any positive signal then appearing at the input will be applied through capacitor C2 to cause the right section of tube V2 to conduct and the pulse will appear at the cathode of the right section of V2 and will appear at the second pulse gate means tube V4.

Additionally, when V1 fires, a positive pulse (see d of Figure 2) is applied through capacitor C4 to the grid of the left-hand section of tube V3 comprised in the second pulse translation means 13. In this latter means the delay network comprises a multivibrator circuit; but it is evident that other types of delay networks could be employed. The multivibrator circuit comprises right and left triode sections of tube V3. Prior to time t1 (see wave form e of Figure 2) the left-hand section of tube V3 is non-conducting. The pulse appearing on the cathode of V1 when the latter fires, triggers the multivibrator tube V3, causing the left section to conduct, and the right section then ceases to conduct. The left-hand section of V3 conducts from time t1 to time t4, as indicated by wave form e of Figure 2, the latter time being determined by the values of the elements comprised in the multivibrator circuit and especially by the values of R9 and C5. When the left-hand section of V3 is conductive the right-hand section is non-conductive, and at such time +300 volts is applied to the cathode of the left section of tube V4, whereby the latter section is rendered non-conductive; and accordingly full +200 volts is applied to the anode of the right section of V4 to just balance the +200 volts applied to the cathode of the right section through R13. Hence under the stated condition a signal pulse of a few volts intensity applied through the right section of V2 will cause the right section of V4 to conduct; and thus a pulse passed by V2 may be passed or translated to the second pulse detector unit tube V5 and cause the latter to fire. As indicated, tube V5 is a gas-filled tube and is preferably a thyratron.

From the preceding description it is evident that if a second signal pulse P2 of a received pair of pulses arrives after time point t2 it will be passed by the right section of tube V2; and further, if it is so passed and arrives prior to time point t4 it will also be passed by the right-hand section of tube V4 to the second pulse detector means comprising tube V5. Further, it is thought to be evident that if the first pulse P1 fails to arrive, pulse P2 will be unable to pass tube V2 and hence will not arrive at the second pulse detector. When a second signal pulse such as P2 arrives during the interval between time points t2 and t4, both pulse gate means 11 and 15 will have been opened by the previous first pulse for passage of such second pulse and thyratron V5 of the second detector means will be fired (see wave form f of Figure 2). Conduction by tube V5 (see wave form h of Figure 2) results in energization of indicator tube V7 and relay device 17 which closes each of line switch Ls, operations control switch means S1, and relay holding circuit switch S2. Also, immediately following closure of those switches, opening of plate supply switch S3 occurs. Failure of tube V7 to illuminate is indicative of non-arrival of P1 or non-arrival of P2 within the interval t2 to t4. Switches Ls, S1, S2 and S3 may be and preferably are, as indicated, parts comprised in a relay means 17 whose coil is connected as indicated in the cathode circuit of tube V5. When the relay coil is energized by the firing of thyratron V5, operations control switch S1 closes a circuit permitting energization of a one-cycle operations programmer, and thus enables apparatus not shown to initiate a new cycle of operations. Until switch S1 is thus closed (or a manually operable switch S6 in parallel with S1) a new cycle of operations cannot be initiated. As hereinbefore indicated, when switch Ls is thus temporarily closed, the first and second signal pulses delayed and translated by the signal delay means 19 are permitted to pass therefrom to the signal utilization means comprising units 20 and 21. Further, at this time the plate potential of +300 volts normally applied to the anodes of thyratrons V1 and V5 is disrupted by opening of switch S3, to extinguish and return to normal those tubes; and switch S2 is closed, permitting continued energization of relay 17 through serially connected switches S7 and S8.

Closure of switch S1 in response to energization of relay 17 conditions the operations cycling means to commence a new cycle of operations as soon as the subsurface apparatus 2 has been lowered (or raised) to a new operating station. The holding circuit for the relay maintains the relay active during such positioning of apparatus 2.

Upon arrival of apparatus 2 at the new operating station the operations cycling device starts and the latter operates through one cycle or revolution and automatically stops. At an appropriate time during such cycle, switch S8 is opened by the device, breaking the relay holding circuit. The relay then returns to normal open condition, opening switches Ls, S1 and S2, and re-applying anode potential to the thyratrons by closing switch S3. These actions return the means depicted in Figure 3 to starting condition with the indicator tubes dark and the means ready for reception of another signal pulse pair.

It is evident from consideration of the apparatus and operation thus far described that in the event both first and second pulses of a pulse pair are not received in correctly time-spaced relationship, tube V5 will not fire and relay 17 will not be operated, with the result that further automatic cyclical operation of the apparatus is precluded. Manual correction of a defect by the operator of the apparatus at the surface of the earth is then required before operations may be continued. These corrective operations include re-establishment of the subsurface apparatus 2 at the station in the borehole at which defective signaling occurred. Manual restarting of cyclical operations of measurement, signaling, and logging may be effected by the operator of the apparatus by closing auxiliary switch S6. As indicated, switch S6 is in parallel with switch S1 operated by relay 17. Normally open switch S5 may be manually operated to close relay 17.

From the preceding explanation it is evident that if a pair of signal pulses is successfully received with the second of the pair of pulses properly time-related to the first pulse thereof, the error detecting and pulse arrival indicating devices are returned to normal operating conditions, and the signaling and other apparatus is permitted to operate through another cycle under control of the cable hoist or like means. If, however, one or the other or both of the signal pulses fails to arrive, one of the pulse indicator tubes will fail to glow or illuminate and by such failure indicate non-arrival of a properly time-related pair of pulses; and commencement of another cycle of operations will not be permitted. Only in the event both the first and second signal pulses of a signal pulse pair, arriving in properly time-spaced relationship, will result in any signal being translated to the signal utilization means. Accordingly, incorrect values represented by defective signals may not be tabulated or registered by the signal utilization means.

Electronic and electrical values of the several components of the apparatus should be chosen in accordance with good design principles. In the specific embodiment of apparatus illustrated, the principal components may be of values indicated in the following table:

| | |
|---|---|
| V1, V5 | 5643 (thyratrons). |
| V2, V4 | 6110. |
| V3 | 12AU7. |
| V6, V7 | NE51 (1st and 2nd pulse arrival indicators). |
| C1, C4 | 250 $\mu\mu f$. |
| C2 | .001 $\mu f$. |
| C3, C5 | .002 $\mu f$. |
| C6, C7 | 1000 $\mu\mu f$. |
| C8 | .25 $\mu f$. |
| R1, R5, R6, R7, R12, R13, R14, R15 | 1M. |
| R2, R3 | 47K. |
| R4 | 410K. |
| R8 | 100K. |
| R9 | 2.2M. |
| R10 | 4700 ohms. |
| R11 | 39K. |
| R16 | 7500 ohms. |

In the light of the present disclosure it is evident that many modifications of the preferred form of apparatus may occur to those skilled in the art; and accordingly it is not desired to limit the invention to the specific details in the exemplary apparatus shown and described, but what is claimed is:

1. In a failure indicator and signal system controller adapted for use in a system in which a signaling means is adapted to be repetitively operated through a cycle of operations including the initiation of a signaling sequence, reception and detection of a pair of time-separated electrical signal pulses, and activation of the signaling means for a new operations cycle, apparatus comprising: a first means effective when activated to initiate a signaling sequence; a second means to receive and detect a pair of properly time-separated electrical signal pulses; means responsive only to reception and detection of such pair of properly time-separated electrical signal pulses by said second means, to activate said first means, and including means preventing activation of said first means in the absence of reception and detection by said second means of such pair of properly time-separated electrical signal pulses; and means controlled by said second means for indicating failure of reception and detection of either of such pair of properly time-separated electrical signal pulses.

2. In an electrical signal failure indication and control system, apparatus for indicating failure of a pair of electrical pulse signals to arrive at a receiver in proper time spaced relationship, comprising, in combination: an input circuit upon which such pulse signals are adapted to be received; a first detector means adapted to detect the first pulse of a pair of such pulse signals; an indicator means operated in response to reception of a pulse by said first detector; means including a delay means and a normally closed first pulse gate means, connected to receive a signal pulse from said input circuit and controlled by said first detector and delay means in response to detection of such first pulse to open said first pulse gate means after a predeterminable time lapse following such detection; means including a second delay means and a second pulse gate means opened for a predetermined period only in response to reception of said first pulse by said first detector; a second detector means and means connecting said first pulse gate means, said second pulse gate means and said second detector means in series for detection by said second detector means of only signal pulses received by said input circuit while both said first and second pulse gate means are open; and means connected to said second detector means and operable in response to detection thereby of a signal pulse to provide an indication of such detection.

3. In a system for effecting a signal control function in response to reception of two time-spaced electrical signal pulses having time-separation restricted to an interval of predetermined duration, apparatus comprising: a signal input circuit; a first pulse detector means connected to receive signal pulses from said input circuit; a first signal pulse gate means connected to receive signal pulses from said input circuit and translate such pulses only when the pulse gate is open; first control means connected between said first detector and said first pulse gate means, effective to open the latter only subsequent to and in response to detection of a first signal pulse by said first pulse detector means; second pulse gate means connected to receive and when opened to translate pulses translated by said first pulse gate means; second control means, connected between said first detector means and said second pulse gate means and effective to open said second pulse gate during only a predetermined period of time following and in response to, detection of such first signal pulse by said first pulse detector means; and signal control means including a second detector arranged to detect and utilize a signal pulse translated by said second pulse gate means; whereby only a signal pulse following such first pulse within predetermined time limits is translated by said second pulse gate to be utilized by said signal control means.

4. A system for controlling generation of an electrical signal in response to only properly timed arrival of an incoming pair of electrical signal pulses, comprising in combination: means including a first detector to receive and detect incoming signal pulses; a first pulse gate means arranged when opened to receive and translate an incoming signal pulse; means controlled by said first detector to open said first pulse gate means only subsequent to detection of a first signal pulse; a second pulse gate means connected in series with said first pulse gate means and effective when open to translate a signal pulse translated by said first pulse gate means; means responsive to detection of such first signal pulse by said first detector to open said second pulse gate means for a predetermined period of time only; and means responsive to a signal pulse translated by both of said pulse gate means to control generation of an electrical signal.

5. In a system for controlling initiation of signaling operations of a repetitive nature, in which signal creation is in response to reception of electrical signal pulses separated in time within predetermined interval limits, apparatus comprising in combination: means to control the initiation of signals; an input means for the reception of first and second time-spaced signal pulses; first detector means connected to said input means to detect incoming signal pulses; a normally closed first pulse gate means connected to said input means; first control means responsive to detection of a first signal pulse by said detector to thereafter open said first pulse gate means for translation of a succeeding pulse; a second pulse gate means connected to translate only pulses translated by said first pulse gate means and means for opening the second pulse gate means under control of said first pulse detector in response to detection of said first signal pulse; and a second pulse detector connected to said second pulse gate means and connected to control said first-mentioned means, in response to detection of such succeeding pulse translated by said second pulse gate means.

6. Apparatus according to claim 5, including first and second pulse arrival indicators connected respectively to the first and second pulse detectors and effective to indicate detection thereby of respective first and second signal pulses.

7. In a system for indicating arrival failure of either of two time-separated pulses of an electrical pulse signal at a receiver, apparatus comprising: a signal input means; a first pulse detector connected to detect pulses received on said input means; a first, normally closed, pulse gate means connected to said input means to receive pulses therefrom; means connected between said first pulse detector and said first pulse gate means and effective in responsive to detection of a first pulse by said detector to open said first pulse gate means only after a predetermined delay; a second pulse gate means connected to receive and translate pulses translated by said first pulse gate means; means connected between said first detector and said second pulse gate means and effective in response to detection of such first pulse by said detector to open said second pulse gate means for predetermined time following such detection, whereby a second pulse following such first pulse within predetermined time limits only may be translated by both said first and second pulse gate means; means including a second pulse detector connected to receive and utilize only pulses translated by said second pulse gate means; and first and second pulse-arrival indicator means responsive to detection of a pulse by said first and second pulse detectors, respectively, to indicate detection thereat of said first and second pulses, respectively.

8. Acoustical well logging apparatus comprising: a transmission medium on which signal pulses are receivable for utilization in logging; a signal delay device connected to said medium to receive, delay, and pass on, signal pulses from said medium; signal utilization means comprising means to log information derived from signal pulses thereto fed; means including a normally open line-closing device connecting said signal delay device to said signal utilization means to receive and translate delayed signal pulses from the delay device to the utilization means when the line-closing device is closed; and means connected to said transmission medium and effective only in response to reception from said transmission medium of a first signal pulse and a second signal pulse succeeding the first signal pulse within a predetermined time interval, to temporarily close said line-closing device to pass such first and second signal pulses as delayed by said signal delay device, for utilization by said signal utilization means.

9. Earth borehole investigating apparatus comprising, in combination: means for operation in an earth borehole for obtaining information to be logged and for producing at least one pair of signal pulses whose time-separation within minimum and maximum time duration limits contains one bit of information; a transmission medium adapted for conveying said pair of signal pulses from within such earth borehole to a location outside the borehole; means including a signal delay device having an output and an input, connected to said transmission medium for receiving signal pulses therefrom and for translating and delaying the received pulses into delayed output pulses; a signal utilization means; means including a signal line and a normally open line-closing means in the signal line, interconnecting the output of said signal delay device and said signal utilization means and capable of transmitting signal pulses to said signal utilization means only when said line-closing means is closed; means connected directly to said transmission medium for reception of signal pulses therefrom and effective to temporarily close said line-closing means for passage of delayed and translated signal pulses, only in response to reception of a properly time-related pair of signal pulses comprising a first signal pulse and a succeeding second signal pulse time-separated from such first signal pulse by a time period whose duration is within said maximum and minimum time duration limits.

10. An acoustical well logging system in which acoustical information is signaled by pairs of signal pulses in which the time-spacing of the first and second pulses of a pair represents information, and including means to prevent logging of information when either of the signal pulses of a pair fails to be properly received, comprising: a transmission medium on which signal pulses are receivable for utilization in logging; means connected to said medium and triggered by a first signal pulse received from said medium and thereby rendered conductive to pass a succeeding second signal pulse during only a predetermined period of time commencing subsequent to receipt of the triggering signal pulse; and means rendered effective only by passage of such succeeding second signal pulse by said triggered means, for receiving, translating, and logging the information represented by the time-spacing of such first and second signal pulses, whereby only information represented by properly received first and second time-spaced signal pulses may be logged.

11. An acoustical well logging system in which acoustical information is signaled by pairs of signal pulses each of finite time duration, in which system the time-spacing of the first and second pulses of a pair represents a bit of information to be logged, comprising, in combination: a transmission medium on which signal pulses are receivable for utilization in logging; means comprising a signal delay device connected to said medium to receive, delay, and pass on, signal pulses from said medium; signal utilization means comprising means to derive and log information derived from signal pulses thereto fed; means including a normally open line-switch connecting said signal utilization means to said signal delay device, for translating signal pulses from said delay device to said utilization means when the line-switch is closed; control means connected to said transmission medium and effective to close said line-switch for translation of signal pulses therepast only in response to arrival of first and second properly time-spaced signal pulses, such control means comprising pulse gate means responsive to a first signal pulse to pass a succeeding second signal pulse only if such second signal pulse arrives at said gate means within a predetermined acceptance time interval commencing subsequent to arrival of such first signal pulse at said gate means, and such control means also comprising means activatable only by such second pulse passed by said gate means, to temporarily close said line-switch for passage of the delayed first and second signal pulses to said signal utilization means.

12. In an acoustical well logging system in which successive pairs of time-spaced signal pulses representing respective bits of acoustical information are transmitted from within a borehole being logged to a location outside the borehole for reception and translation, signal detecting and translating apparatus comprising: a transmission line extending from within such borehole and upon which first and second time-spaced signal pulses of a signal pulse pair are receivable; signal pulse pair utilization means; means including signal pulse delay means, connected to said transmission line and connectable to said signal pulse pair utilization means; means including a normally open switch, for connecting said pulse delay means to said signal pulse pair utilization means; first detector means connected to said transmission line to receive and detect incoming first and second time-spaced electrical signal pulses; means including pulse gate means under control of said first detector means and rendered effective thereby in response to detection of a first signal pulse, to translate a succeeding signal pulse during only a predetermined acceptance time interval commencing subsequent to detection of such first signal pulse, whereby said gate means may translate a second signal pulse during only said predetermined acceptance time interval; and means including a second pulse detecting means, arranged to detect only a signal pulse translated by said pulse gate means and responsive thereto to temporarily close said switch, whereby to pass from said pulse delay means to said signal pulse pair utilization means only complete pairs of signal pulses, the second pulse of which arrives on said transmission line during said acceptance time interval.

13. In an acoustical well logging system for logging information represented by the time-separation of first and second signals created on a signal transmission medium in an earth well in response to initiation of a logging cycle, and in which system only information is logged which is represented by the time-separation of signals the second of which signals follows the first signal during an acceptance period of predetermined duration commencing subsequent to occurrence of the first signal, apparatus comprising: operations control means operable when activated by a produced electric output to initiate a logging cycle; a signal transmission medium; means for creating on said transmission medium information-representing first and second signals in response to initiation of a logging cycle; means including signal translating and delay means, connected to said transmission line and operative upon reception of signals therefrom to translate and pass on corresponding delayed electric signals; signal utilizing means including means to log information represented by time-spaced first and second signals translated thereto; means comprising a normally open circuit-closer, connecting said signal translating and delay means to said signal utilizing means and effective to translate signals to the latter means only when the circuit-closer is closed; control means connected to said transmission medium and operating to detect arrival of a first signal and thereafter operating in response only to detection of arrival of a second signal during said acceptance period to produce an electric output; and means for using said electric output to activate said operations control means and to temporarily close said circuit closer for passage of such corresponding delayed electric signal pulses to said signal utilizing means.

14. A system as defined in claim 13 including in said control means, indicator means responsive to reception of such first signal to indicate such reception and indicator means responsive to reception of such second signal to indicate such reception.

15. In an acoustical well logging system in which a signaling means is adapted to be repetitively operated through a cycle of operations including the initiation of a signaling sequence, and in which pairs of time-spaced signal pulses representing acoustical information are transmitted from within a borehole being logged to a location outside the borehole for reception and translation, a signal failure indicator and signal system operations controller comprising, in combination: a system operations control means operable only when activated to initiate an operations sequence; signaling means to receive and detect a pair of properly time-separated electric signal pulses; means responsive only to reception and detection of both the first and second of a pair of properly time-separated electric signal pulses by said signaling means, to activate said operations control means, and prevent operation of said operations control means in the absence of reception and detection by said signaling means of both such first and second pulses of said pair of signal pulses; and means controlled by said signaling means for indicating failure of reception and detection of either of the first and second pulses of said pair of signal pulses.

16. In an acoustical well logging system in which pairs of time-spaced signal pulses representing acoustical information are transmitted from within a borehole being logged to a location outside the borehole for reception and translation, means for indicating failure of reception of either of the pulses of any pair of such signal pulses, comprising in combination: a pulse transmission medium on which said first and second time-spaced signal pulses of a pair are receivable; a first pulse detector means connected to receive signal pulses from said transmission means; a first signal pulse gate means connected to receive signal pulses from said transmission means and arranged to translate such pulses only when the pulse gate is open; first control means connected between said first detector and said first pulse gate means, effective to open the latter only subsequent to and in response to detection of a first signal pulse by said first pulse detector means; second pulse gate means connected to receive, and when opened to translate, pulses translated by said first pulse gate means; second control means, connected between said first detector means and said second pulse gate means, effective to open said second pulse gate means only during a predetermined period of time following and in response to, detection of such signal pulse by said first pulse detector means; and signal pulse translation control means including a second detector means arranged to detect and utilize a signal pulse translated by said second pulse gate means whereby only a signal pulse following such first signal pulse within predetermined time limits is translated by said second pulse gate means for utilization and operation of said pulse signal translation control means.

17. In an acoustical well logging system in which pairs of time-spaced information-representing signal pulses are transmitted from within a borehole to be logged, to a location outside the borehole for reception and translation, means for indicating failure of arrival of any pulse of any such pair of signal pulses comprising, in combination: signal input means on which said first and second time-spaced signal pulses are receivable; a first pulse detector connected to detect pulses received on said input means; a first normally closed pulse gate means connected to said input means to receive pulses therefrom; means connected between said first pulse detector means and said first pulse gate means and effective in response to detection of a pulse by said first detector means to open said first pulse gate means only after a predetermined time delay; a second normally closed pulse gate means connected to receive and when open to translate pulses translated through said first pulse gate means; means connected between said first detector means and said second pulse gate means and effective in response to detection of such first pulse by said first detector means to open said second pulse gate means for a predetermined time only following such detection, whereby a second received pulse following such first pulse within predetermined time limits only may be translated by both said first and second pulse gate means; means including a second pulse detector means connected to receive and utilize only pulses translated by said second pulse gate means; and first and second pulse arrival indicator means responsive to detection of a pulse by said first and second pulse detectors, respectively, to indicate only detection thereat of said first and second pulses, respectively.

18. In a signaling system in which information is represented by the separation in time of first and second electrical pulses of respective pulse pairs in each valid pair of which the second pulse is transmitted within a predetermined-duration time interval subsequent to transmission of the first of the two pulses, means for excluding from pulse pair utilizing means all pulses except such valid pairs of pulses, comprising, in combination: a transmission medium on which such pulses are receivable; a pulse pair utilizing means; a pulse delay device connected to said transmission medium for reception of pulses therefrom; means including a normally open circuit interconnecting said delay device and said pulse utilizing means for translation of pulses from the delay device to the utilizing means only when said circuit is closed; and means connected to said transmission medium and operating only in response to reception of such a valid pair of electrical pulses to close said circuit to pass such valid pair of pulses as delayed by said delay device, to said pulse utilizing means for utilization, whereby pulses other than pulses comprised in such a valid pair of pulses are excluded from said utilizing means.

19. Acoustical well logging apparatus comprising a transmission medium on which signal pulses are receivable for utilization in logging; a signal delay means connected to said medium to receive signal pulses from said medium, store information contained therein, and pass on information signals related to said stored information; signal utilization means comprising means to log information from information signals thereto fed; means including a normally open line-closing device connecting said signal delay means to said signal utilization means to receive and translate said information signals related to said stored information from the delay means to the utilization means when the line-closing device is closed; and means connected to said transmission medium and effective only in response to reception from said transmission medium of a first signal pulse and a second signal pulse succeeding the first signal pulse within a predetermined time interval, to temporarily close said line-closing device to pass information signals related to the stored information corresponding to the respective first and second signal pulses, for utilization by said signal utilization means.

References Cited in the file of this patent
UNITED STATES PATENTS

| | | |
|---|---|---|
| 2,522,609 | Gloess | Sept. 17, 1950 |
| 2,534,746 | Wells | Dec. 19, 1950 |
| 2,589,465 | Weiner | Mar. 18, 1952 |
| 2,609,533 | Jacobsen | Sept. 2, 1952 |
| 2,679,037 | O'Keefe | May 18, 1954 |
| 2,729,808 | Auerbach et al. | Jan. 3, 1956 |
| 2,735,084 | Adkisson | Feb. 14, 1956 |
| 2,769,971 | Bashe | Nov. 6, 1956 |